Patented July 28, 1925.

1,547,571

UNITED STATES PATENT OFFICE.

CARLETON ELLIS, OF MONTCLAIR, NEW JERSEY.

SYNTHETIC EDIBLE FAT.

No Drawing. Substitute for application No. 269,341, filed January 2, 1919. This application filed October 30, 1920. Serial No. 420,732.

*To all whom it may concern:*

Be it known that I, CARLETON ELLIS, a citizen of the United States of America, residing at Montclair, in the county of Essex and State of New Jersey, have invented certain new and useful Improvements in Synthetic Edible Fat, of which the following is a specification.

This invention relates to edible fatty material or to fatty material which may be employed for certain technical purposes and relates especially to a fatty product obtained from glycerin and stearic acid, or from mixtures of stearic and palmitic acids, by esterification.

*Example 1.*—I will describe the invention by giving an illustration of its application in the production of one form of edible fat namely lard compound or lard substitute. For this purpose 200 parts by weight of high grade commercial stearic acid which contained palmitic acid was heated with 36 parts by weight of glycerine for a period of two hours at a temperature of 175–200° C., and then for three hours at 240° C. The heating was in one case carried out at atmospheric pressure in an atmosphere of an inert gas. The melting point of the original fatty acid was 56.5° C., and that of the final product 54.5° C. It was substantially free from glycerine and had an acid number of about 10.

The synthetic fatty ester may also be purified and deodorized, thus while ordinary commercial stearic acid which has been well pressed is light in color and the synthetic product is usually white, the product is far lighter than any bleached stearine or purified hydrogenated oil. This color therefore makes it possible to produce white fats, which are more acceptable to the trade.

*Example 2.*—The crude product may have an unpleasant flavor, probably due to the fact that commercial stearic acid is commonly made by the distillation of low grade fats. By heating the product of esterification to 160° C., and under a vacuum of say 25 to 26 inches, and blowing with superheated steam this unpleasant taste is removed together with traces of the free acid which have escaped esterification. At least the latter is removed to some extent and the higher the vacuum and temperature the more acid is removed. In some cases the temperature can be run up as high as 200–230° C., without injury to the product.

*Example 3.*—Twenty per cent of the hard product of Example 1 was melted and incorporated with 80% of refined cottonseed oil. This product was chilled and a lard-like substance obtained which was sweet to the taste and of a very desirable texture. Although light in color the appearance was improved by beating as air or other gas was incorporated with the fat and whitened it somewhat.

*Example 4.*—In a similar manner twelve per cent of the synthetic glyceride was incorporated with eighty-eight percent of cottonseed oil to make a fat of about the consistency of butter fat which could be churned with sour milk, etc., to produce a butter substitute.

In the proportions given in Example 1, the amount of glycerine is approximately that required to produce the diglyceride, but by modifying the proportions the mono- and triglyceride may be produced. Mixtures of the mono-, di- and triglycerides, especially products consisting largely of diglyceride, may be used in such mixtures as are herein disclosed. While a product as described is made from a mixture of stearic and palmitic acid it may likewise be prepared from pure stearic acid or pure palmitic acid.

*Example 5.*—The synthetic glyceride may be employed by mixing with liquid or semiliquid oils, to thicken the same, and oils can be used which are not of an edible character, such as cod oil and the like to produce tallow-like bodies which may be used for stuffing leather or other purposes, but the invention is especially directed to the production of edible products or of materials from which edible fats may be produced.

Various oils may be admixed with the synthetic product, above described, such for example as various vegetable oils including corn, cottonseed, peanut, sesame, soya bean, castor, linseed, Chinese wood oil and the like or animal oils such as lard, tallow and marine animal oils including the various fish and whale oils. Cocoanut oil may be employed with advantage, the synthetic glyceride being used to thicken the cocoanut oil somewhat to make it better suited for use in confectionery and in the preparation of butter substitutes and lard compounds. The addition of from ten to thirty percent of the synthetic glyceride or even lesser or greater quantities enables a fat to be produced containing cocoanut oil which is excellent for cooking purposes or for the manufacture of chocolate creams, ice-cream and the like.

*Example 6.*—By varying the character of the fatty acid employed, the melting point of the synthetic glyceride may be raised or lowered. For example if the fatty acids of cocoanut oil are added to the solid fatty acids which are preferably employed in the present invention the melting point is lowered as also is the case if oleic acid is introduced. Thus, the mixed glyceride esters of stearic palmitic, oleic and lauric acids may be obtained.

The synthetic glyceride appears to have properties which render it unusually good for incorporating with other fats and oils, producing compounds of remarkably fine texture, color and stability and there is not the same evidence of granulation and segregation as is noticeable when some of the other fatty materials employed in the edible field are so incorporated.

The present application is filed as a substitute for my prior application filed January 2, 1919, Serial No. 269,341.

The preparation of synthetic fats in this manner has one advantage in some cases that being the unusually good color of the product. At the present time a crude oil during the refining process is usually bleached by means of fuller's earth or sulfuric acid or some bleaching agent which may affect the flavor or chemical constitution of the oil. In some cases this effect is of an unfavorable character. In the present case the stearic acid which may be employed is that obtained by pressing of fats and by such pressing the coloring matters are removed in the olein or oleic acid. Thus stearic acid is obtained which has not been subjected to specific bleaching operations other than the operation of pressing. For example a triple pressed stearic acid is very white, entirely free from the cream color or yellow tint of ordinary stearines and tallows and when such a white acid is combined with glycerin away from the air so that discoloration does not take place during esterification, a product may be obtained which is of extraordinary whiteness and which therefore when admixed with oils in the production of edible products, yields a more attractive edible material. Many commercial grades of stearic acid have however a flavor which is unsatisfactory and the esterified product should therefore be deodorized as for example by blowing with steam or inert gas under vacuum.

The term "synthetic glycerid of a higher fatty acid" as herein employed, is not intended to embrace hard hydrogenated fatty oils, although such products have sometimes been heretofore incorrectly referred to as "synthetic fats", but is intended to cover fats made by combining the fatty acid with glycerin.

I claim:

1. A fatty product of about a lard-like to butter-like consistency comprising a synthetic diglyceride of a higher fatty acid and a vegetable oil.

2. A fatty product consisting of a synthetic diglyceride of stearic and palmitic acids incorporated with a major proportion of a vegetable oil.

3. An edible product consisting of the diglyceride of stearic and palmitic acids incorporated with a major proportion of an edible vegetable oil.

4. An edible product comprising a synthetic glyceride of a fatty acid solid at normal room temperature, such glycerid material including a diglycerid as an ingredient, incorporated with a major proportion of an edible oil.

5. A blended fatty compound consisting essentially of a synthetic diglyceride of a fatty acid, mixed with a natural glyceride oil.

In testimony whereof I affix my signature.

CARLETON ELLIS.